Sept. 3, 1957
G. K. E. H. STAMPE
2,804,936
DUST FILTERS
Filed Aug. 18, 1954
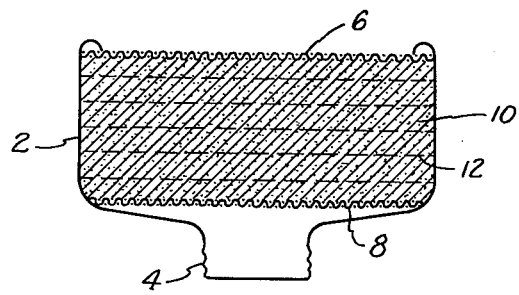
INVENTOR
Gerhard Stampe
BY Bailey, Stephens & Huettig
ATTORNEYS

2,804,936

DUST FILTERS

Gerhard K. E. H. Stampe, Lubeck, Germany, assignor to Otto Heinrich Drager, Lubeck, Germany Application August 18, 1954, Serial No. 450,586

Claims priority, application Germany July 18, 1953

5 Claims. (Cl. 183—49)

This invention relates to dust filters. In particular, the invention is directed to filter materials to be used in respirators.

Filtering materials for use in respirators have generally consisted of fine fibrous material, for example, paper. These filter materials have the disadvantage in that they offer a comparatively high resistance to the passage of air therethrough. This resistance to the passage of air is a limitation upon the minimum size and weight which can be given a filter. Other filter materials, such as sponge rubber or the like, also have a relatively high resistance to the passage of air. In addition, the construction of the filter is complicated and thus expensive.

The object of the instant invention is to employ filter materials which in comparative little volume will filter out dust particles and the like, and at the same time will not impede the passage of air therethrough to such an extent as would make it hard and difficult to breathe.

In general, the objects of the invention are obtained by using a filter composed of a synthetic material, preferably of a hydrophobic synthetic material in the form of granules, grains, shavings or the like. Unexpectedly, it has been found that a filter composed of such materials will filter aerosols out of the air passing therethrough. In forming the filter unit, the filter material is placed in a housing between screens as heretofore used in activated charcoal filters. The screens exert sufficient pressure upon the filter material to keep it together. A filter so constructed can be used in a face mask in which the filter canister is carried by the mask, or in a respirator in which the filter canister is carried, for example, on the shoulder. Other kinds of filters, such as those used for air conditioning rooms, can also be constructed using the material of this invention. The particle size of the filter material used has a diameter of about 1 mm. The particular particle size must be such that the resistance to the passage of the air through the filter does not exceed the required rate of flow of air through the filter. Hydrophobic synthetic materials are preferably used as the filter material. It is also preferred to have the filter composed of both hydrophobic and hydrophilic synthetic material in which case it is preferred that the quantity of hydrophobic synthetic material exceeds the quantity of hydrophilic synthetic material in such filter.

The means by which the objects of the invention are obtained are described more fully with respect to the accompanying drawing which diagrammatically shows a filter canister in cross-sectional view.

The filter canister comprises a container 2, which in the form shown, is adapted to be connected to a face mask respirator by means of threaded fitting 4. Screens 6 and 8 hold the filter material 10 under pressure within container 2. Nets or screens 12 of filter material can be imbedded in the filter material 10.

Filter material 10 is composed of materials based on polyethyl and/or polyisobutylene, which are hydrophobic synthetic materials. In addition, material 10 can be a polyvinylchloride.

For the hydrophilic synthetic materials, such can be based on polyamidons, polyvinylalcohol and/or hydrate cellulose.

If a mixture of hydrophobic and hydrophilic synthetic materials are used, the quantity of hydrophobic material preferably exceeds that of hydrophilic material. If desired, nets or screens 12 of synthetic material, or threads of synthetic materials can be imbedded in filter material 10.

The invention may be used according to the following specific examples:

Example 1

A cylindrical filter unit having a diameter of 100 mm. and a height of 15 mm. was placed in container 2. The filter unit is composed of 30 grams of grains of polyethylene and 20 grams of grains of hydrate cellulose. The polyethylene grains are substantially globular with a diameter of 1 mm. The hydrate cellulose is in the form of about 0.8 mm. cubes. Both the hydrophilic and hydrophobic materials are homogeneously distributed in the filter unit. Screens 6 and 8 compress the filter material at a pressure of about 100 g./cm.$^2$. Air can be inhaled through filter unit at an average rate of 30 liters/min. The filter unit offers a resistance to the passage of air of from 2–3 mm. water column. When air containing 10 mg./m.$^3$ of silica dust is passed through the filter unit, the silica particles being about 1$\mu$, more than 99 percent of the dust is filtered from the air in the filter unit.

Example 2

A filter for the air conditioning of rooms is composed of a filter unit contained within a rectangular frame to form a surface of about 300 x 500 mm., and having a thickness of about 20 mm. The filter material consists substantially of polyisobutylene shavings having a length of from 3–4 mm. and being 2 mm. wide and 0.1 mm. thick. The surfaces of the shavings are irregular rather than being plane, so that the mass is like a flexible cushion which is compressed between the screens with a pressure of about 250 g./cm.$^2$. The filter material weighs about 1 kg. This filter unit has a resistance of about 1 mm. water column through an air stream passing therethrough at a rate of 0.5 m.$^3$/min. The filter effect is equivalent to that found in the first example.

Example 3

A face mask filter unit is formed having a size and capacity corresponding to that described in Example 1. The filter material is composed of irregular grains of polystyrene having a size of about 1 mm.$^3$. The mass is subdivided into layers 2 mm. thick by nets 12. These nets are composed of threads of about 0.05 mm. diameter of polyvinylalcohol and have an 0.5 mm. mesh. The filter material weighs 65 grams and the nets, which also function as filters, weigh 2 grams, the material being compressed between the screens at the pressure of 150 g./cm. The filter performed substantially as described for the filter of Example 1.

Similar filters of hydrophilic material can be constructed, the material being, for example, shavings of polyamide.

This application is a continuation-in-part of my application Serial No. 444,139, filed July 19, 1954, for "Dust Filters."

Having now described the means by which the objects of the invention are obtained.

I claim:

1. A dust filter comprising a canister, a filter filling in said canister composed of particles of hydrophobic synthetic material, each particle having a volume of about one cubic millimeter, and means for holding said material in said canister.

2. A dust filter as in claim 1, said filter filling further comprising a mixture of hydrophobic and hydrophilic synthetic materials in which the quantity of the former exceeds that of the latter.

3. A dust filter as in claim 2, said hydrophobic synthetic material being selected from the class consisting of polyethyl and polyisobutylene substances, and said hydrophilic material being selected from the class consisting of polyvinylalcohol and cellulose hydrate substances.

4. A dust filter as in claim 1, said filling further consisting of a material selected from the class of polyethyl and polyisobutylene substances.

5. A dust filter as in claim 1, said holding means comprising nets of synthetic filter material interposed in said filling.

References Cited in the file of this patent

UNITED STATES PATENTS

| | | |
|---|---|---|
| 1,847,297 | Dotter | Mar. 1, 1932 |
| 1,963,874 | Stampe | June 19, 1934 |
| 2,195,565 | Fricke | Apr. 2, 1940 |
| 2,411,660 | Manning | Nov. 26, 1946 |
| 2,442,356 | Gross | June 1, 1948 |
| 2,689,199 | Pesce | Sept. 14, 1954 |